Jan. 18, 1966 R. V. KEYS 3,230,498

MULTIPLEX CONDUCTOR CONNECTOR APPARATUS FOR PRINTED CIRCUITS, MULTIPLE CONDUCTOR TAPE, AND THE LIKE

Filed Feb. 28, 1964 2 Sheets-Sheet 1

RICHARD V. KEYS,
INVENTOR.

BY Lynn H. Latta

ATTORNEY.

Jan. 18, 1966 R. V. KEYS 3,230,498

MULTIPLEX CONDUCTOR CONNECTOR APPARATUS FOR PRINTED CIRCUITS, MULTIPLE CONDUCTOR TAPE, AND THE LIKE

Filed Feb. 28, 1964 2 Sheets-Sheet 2

RICHARD V. KEYS,
INVENTOR.

BY Lynn H. Latta
ATTORNEY.

United States Patent Office 3,230,498

Patented Jan. 18, 1966

3,230,498

MULTIPLEX CONDUCTOR CONNECTOR APPARATUS FOR PRINTED CIRCUITS, MULTIPLE CONDUCTOR TAPE, AND THE LIKE

Richard V. Keys, Whittier, Calif., assignor of one-half percent to Harold J. Mock, Los Angeles, Calif.

Filed Feb. 28, 1964, Ser. No. 348,115
13 Claims. (Cl. 339—176)

This invention relates to electrical circuit connections in multiple conductor circuits utilizing such circuit devices as multiple conductor tape, printed circuits and similar circuitry components which have been developed principally for use in miniaturized circuits wherein a large number of sub-circuits are encompassed within a minimum area and volume. A general object of the invention is to provide an apparatus for establishing electrical connections between a multiple-conductor ribbon type cable and various electrical components or other type cables. The invention is especially useful in connection with miniaturized circuitry although not necessarily restricted thereto.

Toward the attainment of this general object, the invention aims to provide electrical circuit connector apparatus in which:

(1) Connections are made without the use of termination pins, bus bars, pin and socket connections and the like;

(2) Connections and disconnections may be made without wear on the contacting surfaces;

(3) The millivolt drop across contact points is minimized by increasing the area of contact to an extent at least equal to the circular mil cross sectional area of the conductor elements, thus avoiding the creation of high resistance at the points of contact;

(4) Connector design is of extreme simplicity;

(5) Connections can be established by direct contact between the bared ends of the conductors of a multiple conductor ribbon type cable and the multiple conductor terminals of a printed circuit board;

(6) Such connections can be established to the conductor terminals of both single and double sided printed circuit boards;

(7) Other types of connections can be established, such as to T-junctions, electrical module terminals, and the like;

(8) Resilient loading of the contact connections by relatively simple cushion means operative across a span of any selected number of conductor terminals, and of simple yet effective construction and operation, is provided;

(9) Provision is made for distributing the pressure evenly to the several conductor connections across the span of a printed circuit board even though slight height irregularities may occur as between the several conductor terminal surfaces of the board.

Other objects and advantages will become apparent in the ensuing specification and appended drawing in which.

Figures 1, 2, 2A, 3, 3A, 4:
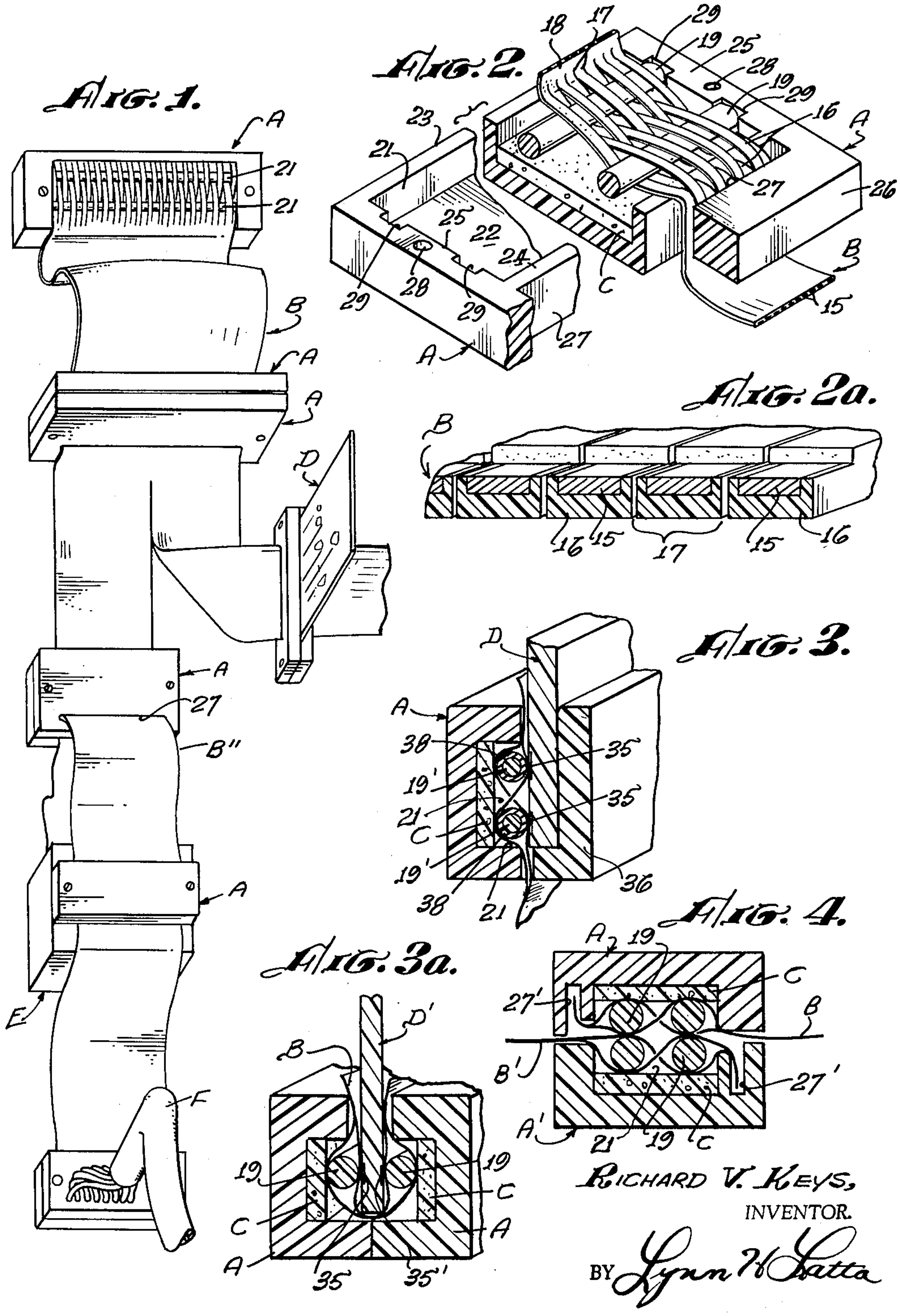
FIG. 1 is a perspective view of a plurality of electrical components connected by the connector apparatus of my invention; the view being schematic in that it brings together a number of different types of connections for the purpose of illustration of the versatility of the invention as applied to such varied types of connections.
FIG. 2 is a fragmentary cross-sectioned isometric view of the connector receptacle and the terminal portion of a multiple conductor ribbon cable, components constituting the basic parts of my improved connector invention.
Figures 5, 6, 7, 8, 9, 10, 11:
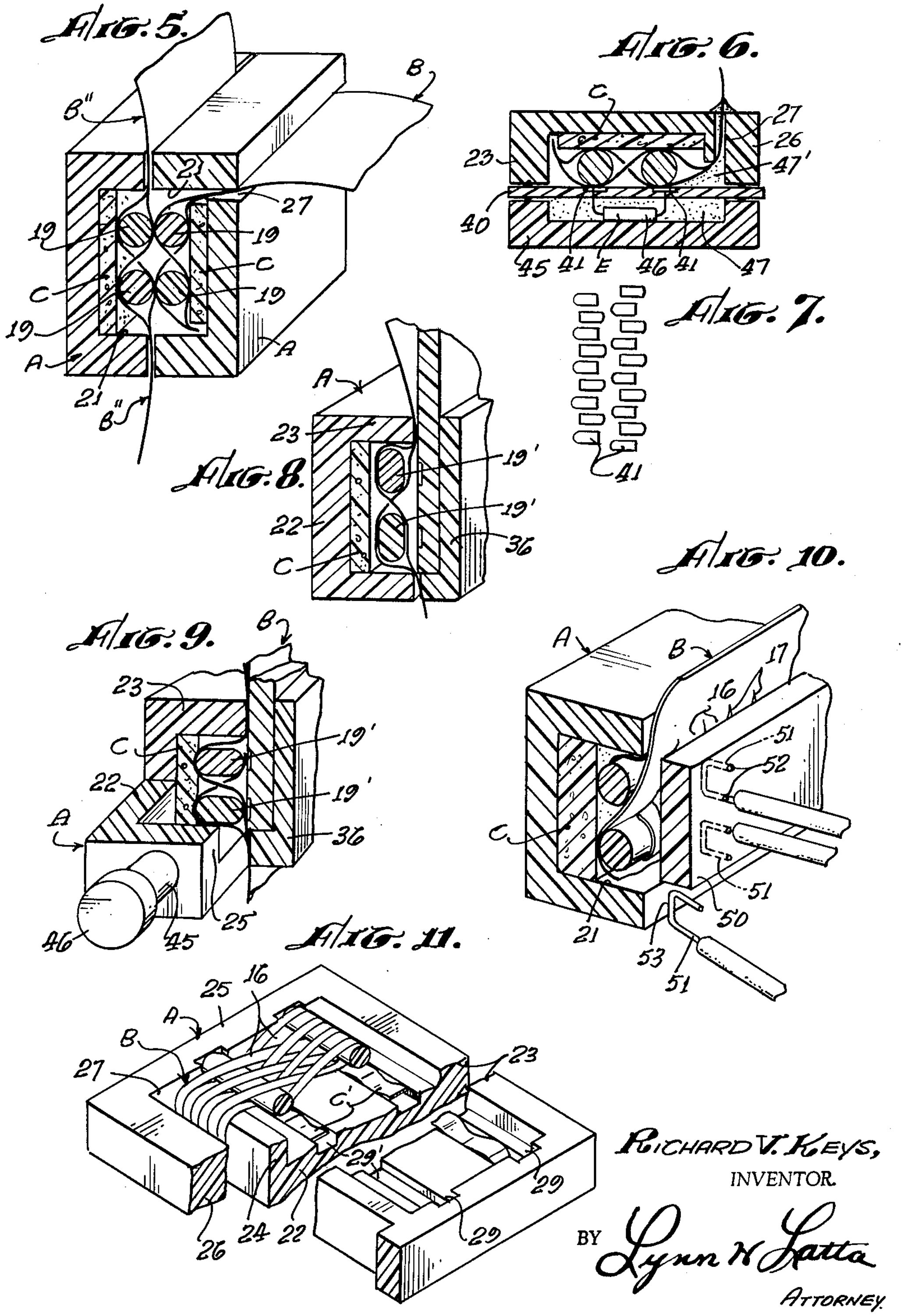

FIG. 2*a* is a fragmentary cross-sectional view of the slitted end of a ribbon cable with conductor ribbons bared for connector contact;

FIG. 3 is a detail cross-sectional view of the FIG. 2 assembly connected to a printed circuit board;

FIG. 3*a* is a cross-sectional view showing an embodiment of the invention in a two-sided printed circuit board connection;

FIG. 4 is a cross-sectional view illustrating the invention embodied in a simple cable-to-cable connection;

FIG. 5 is a cross-sectioned isometric view illustrating the application of the invention to a T junction;

FIG. 6 is a cross-sectional view of a cable-to-module connection embodying the invention;

FIG. 7 is a face view of the artwork of a printed terminal arrangement which may be utilized by the invention;

FIG. 8 is a fragmentary cross sectional isometric view of a connector receptacle and printed circuit board combination embodying a modified form of the invention in which the printed circuit board can be inserted into the receptacle without rubbing engagement between the contact surfaces and in which full electrical contact can be established after the insertion by manipulation of pressure-applying cams which are cushion-loaded in accordance with the invention;

FIG. 9 is a cross-sectional view of the same showing the cams adjusted to pressure-applying positions;

FIG. 10 is an exploded fragmentary cross-sectioned isometric view of a modified form of the invention utilized for interconnecting round-conductor cable to ribbon cable; and FIG. 11 is a fragmentary cross-sectioned perspective view of another modified form illustrating the use of metal spring loading to supplement or replace elastomer cushion loading of the contacts.

*General description of invention*—FIGS. 1–2

Referring now to FIG. 1, the invention in its basic aspect provides a connector receptacle A of substantially rigid molded plastic resin having good insulating character, or equivalent material, in which a plurality of terminals consisting of the split ends of a ribbon type conductor cable B are encapsulated, basket woven across and between a pair of spacer rods 19 of substantially rigid insulating material such as hard plastic resin, and backed by a resilient compressible cushion C (FIG. 2) of elastomer plastic resin material, soft rubber, or equivalent material having a combination of cushioning and insulating properties. Cushion C functions to press the terminals into electrical contact with matching terminals of another electrical component which is connected to the ribbon cable B by the connector apparatus of the invention. Such coupled component can be a printed circuit board D (FIGS. 1 and 3); with a single printed side; a circuit board D' with double printed sides (FIG. 3*a*); a second cable B' (FIG. 4); a T-junction between a ribbon cable B and a through ribbon cable B'' (FIG. 5); a potted module which can be any electrical component such as a resistor, capacitor, transformer, diode, transistor, or the like, indicated generally at E in FIG. 6; or a round cable F (FIG. 10).

The cushion-loading of the contacting conductor elements can be effected by the simple elastomer cushion C of FIGS. 1–6; by the combination of elastomer cushion and pressure-developing cams of FIGS. 8 and 9; by the combination of elastomer cushion and pressure-equalizing tubular elastomer sheaths on the spacer rods as illustrated in FIG. 3 (or by corrugated ribbon springs or equivalent metal springs as illustrated in FIG. 11).

*Detailed description*

Referring now to FIGS. 1 and 2, the most important aspect of the invention is the provision for establishing direct electrical contacts between bared ends of thin conductor ribbons 15 of a ribbon cable B in which the conductors 15 are invested between thin films of plastic material collectively providing an insulating casing for the conductors 15 and maintaining them in spaced parallel relation, extending longitudinally of the ribbon cable. In the preparation of an end of such a ribbon cable, it is subjected to a slitting operation in which the narrow webs of the plastic casing material between the spaced conductors 15 are split longitudinally along their median axes, to provide separate insulated terminal strips 16 separated by slits 17 (FIG. 2*a*) along the margins of each conductor ribbon. The insulation coatings are then shaved away from the terminal strips 16 on one side of the cable to leave the faces of the conductor ribbons 15 bared on that side, for connector contact.

After the slitting and the baring of the end portion of the cable, the conductor strips 16 are separated in the basket weave arrangement shown in FIG. 2. A satisfactory method of doing this is to leave a narrow edging 18 of unslitted material along the end of the cable to tie the ends of the strips 16 together, to then thread a separator needle or awl transversely through the slitted section of the cable near one extremity thereof (e.g. adjacent the body of the cable), threading it alternately beneath and above succeeding strips; to then thread a second separator needle through the slitted area of the cable near its opposite extremity (e.g. adjacent connecting edging 18) with the alternating arrangement of the strips 16 reversed so that the lower strips of the previously separated strips 16 extend upwardly between and in crossed relation to the intervening strips and become the upper strips of the other end portion of the slitted area.

Permanent spacer rods 19 are then inserted between the separated strips 16 as the initial separator needles are withdrawn, and the basket-weave assembly of separated strips with the spacer rods 19 woven therein is then laid into the shallow rectangular chamber 21 in the receptacle A, on top of the cushion C which is of compressible, resilient elastomer material (such as sponge rubber or sponge plastic material) the cushion C covering the entire bottom area of the chamber 21.

Receptacle A embodies a closed bottom 22, an outer side rim 23, an inner side rim 24 and end rims 25 projecting upwardly from the bottom panel 22 to define the shallow rectangular receptacle chamber 21; and a retainer bar 26 bridging between end rims 25 in spaced parallel relation to inner side rim 24 to define therewith a narrow slot 27 which extends through the full depth of the receptacle A from top to bottom thereof. In the connector assembly, the ribbon cable B is threaded through the slot 27 from the bottom side as indicated in FIG. 2, thence over the inner rim 24 and thence into the chamber 21. The connecting edging 18 of the ribbon cable, though shown projecting upwardly out of the chamber 21 in FIG. 2 for illustrative purposes, will be tucked downwardly into the chamber 21 between the rim 23 and the adjacent spacer rod 19. A suitable back-up plate or mating receptacle unit will subsequently be attached to the receptacle A by suitable fastener means (e.g. screws or bolts extended through suitable bolt holes 28 in end rims 25).

Spacer rods 19 are assembled with their ends received in vertical retainer slots 29 in the inner walls of end rim members 25, and are thus retained in fixed spaced relation to one another and to side rim members 23, 24.

Prior to coupling another component to the assembly A, B, C of FIG. 2, the terminal strips 16, with the bared faces of their conductors 15 facing outwardly, will have the high areas thereof (where they are fulcrumed across the spacer rods 19) projecting above the plane of the rim of receptacle A. When another component is coupled to this assembly, its contact terminals will engage these projecting high areas of terminal strips 16 and will press the basket-weave assembly inwardly, indenting the elastomer cushion C, placing the entire assembly under compression, and setting up resilient cushion-loading of the basket-weave terminal assembly.

FIG. 2 shows the basic assembly of split-end cable and receptacle, wherein the bared faces of the conductor ribbons 15 are exposed at the open side of the receptacle A (which is seen at the top of FIG. 2).

FIG. 4 shows a cable-to-cable connector, which can be assembled from duplicate assemblies of receptacle A and cable B as disclosed in FIG. 2, with the bared faces of terminal strips 16 of one cable in face-to-face contact with the bared faces of the terminal strips of the other cable, and securing the two receptacles A together in inverted relation as illustrated in FIG. 4. The complete connector assembly then becomes one in which the back sides of the basket woven terminal sections of the cables are resiliently loaded by the respective elastomer cushions C, embracing the two slitted cable ends between them, compression being established by the drawing of the receptacles A into closed relation to one another.

In the cable-to-cable connector shown in FIG. 1, respective cables B enter respective receptacles A at right angles through respective slits 27 and their respective basket-weave complexes of terminal strips 16 are clamped together between the receptacles at right angles to the projecting cable bodies, the bared contact surfaces of one cable registering with those of the other and resiliently engaging the same under yielding pressure provided by the respective cushions C.

FIG. 4 shows a modification wherein receptacles A′ have closed-bottom grooves 27′ receiving the ends of the respective ribbon cables B, whereas the bodies of the cables extend through gaps between the mating receptacles A′ at respective sides of the assembly. The ribbon cables are clamped tightly between the receptacles in the completed assembly, thus relieving contacting split ends of the cables of tension that may be applied to the joint between the connected cables.

FIG. 3 shows a cable to printed board connector which utilizes the basic combination of receptacle A (shown schematically in simplified form); ribbon cable B with slitted end portion basket-woven around spacer rods; a printed circuit board D extending across the open side of receptacle chamber 21, with spaced rows of printed contact terminals 35 in an "artwork" arrangement which can be similar to that shown in FIG. 7 contacting the high areas of conductor ribbons 15; and a back-up plate 36 secured to receptacle A by suitable fasteners as hereinbefore described and clamping the circuit board D against the receptacle A while maintaining cushion-loaded contact between terminals 35 and 16. The back-up plate 36 may be of L-section as shown, with a flange along one margin to cover the edge of board D. The body of cable B extends between the board D and a side rim flange of receptacle A.

FIG. 3 illustrates a further modification wherein spacer rods 19′ are provided with tubular sheaths 38 of soft rubber or equivalent elastomer plastic material, compressible and resilient so as to supplement the cushion loading provided by elastomer cushion C. Sheaths 38 will be compressed against the terminal strips 16 so as to individually cushion-load each terminal strip. Accordingly, if any opposed terminal 35 of circuit board D should be higher than an adjacent terminal 35, the terminal strip 16 in contact with the high terminal 35 will be impressed more deeply into the backing sheath 38 than the adjacent terminal strip 16 which will be projected into full contact with its opposed lower terminal 35 by the resilient cushioning action of the backing sheath 38.

FIG. 3*a*, shows a two-sided circuit board connector which may provide connections between printed terminals 35 and 35′ on respective sides of board D′, and the terminals of either one or two ribbon cables. FIG. 3*a* may be taken as showing a single cable with its basket-weave slitted end portion doubled around the edge of board D′ so that the two spacer rods 19 are positioned on opposite sides of the board, with one series of terminal strips 16 contacting the row of printed terminals 35 on one side and the alternate series of terminal strips 16 contacting the printed terminals 35' on the other side of the board. The assembly of board and cable are clamped between opposed receptacles A.

FIG. 5 shows a T-junction connection wherein a basket-weave complex of terminal strips is formed in an intermediate section of a through cable B'' and a similar terminal complex is formed in an end of a junction cable B. The two terminal complexes are mounted in the chambers 21 of respective receptacles A, with the respective portions of through cable B'' projecting in aligned relation between the opposed rim flanges of the two receptacles at respective sides of the assembly. The junction cable extends transversely from cable B'', through the slot 27 of its respective receptacle A. Each basket-weave terminal complex is backed by an elastomer cushion C which provides cushion loading on both sides of the pair of abutting basket-weave terminal complexes.

FIG. 6 shows a cable-to-module connection which includes the assembly of receptacle A and ribbon cable B coupled to a printed terminal panel 40 providing a cover for a casing 45 containing a plurality of modular electrical components 46 of miniature proportions, connected to printed terminals 41 attached to the face of panel 40 in rows adapted to register with the rows of bared conductor surfaces of the basket-weave complex of terminals 16. The assembly may be hermetically sealed by potting compound filling the casing 45 at 47 and slot 27 at 47; and by an O-ring gasket 42 mounted in the perimetral groove in receptacle rim 23–26 and sealed against the face of panel 40. As in FIG. 2, the cable B enters the chamber 21 through slot 27.

FIG. 7 illustrates the terminal artwork 41 on the face of panel 40.

FIGS. 8 and 9 illustrate a modified form of the basket-weave terminal complex wherein the spacer rods are replaced by cam rods 19' which are of oval cross-section and have at their ends trunnions 45 journalled in end rim members 25 and terminating in knobs 46 which can be manipulated to rotate the cam rods from pressure-relieving positions shown in FIG. 8, to pressure-applying positions shown in FIG. 9. Thus the printed circuit board D can be inserted into the socket defined between receptacle A and back-up plate 36 without pressurized rubbing contact of the printed terminals of the board against the cable terminals, and when the board is fully inserted, the cam rods 19' can be rotated to apply the resilient pressure of cushion C to the terminals 16 and to press them against the terminals 35 of board D.

FIG. 10 illustrates how the assembly of receptacle A, cable terminal complex 16 and cushion C can be coupled to a terminal board 50 in which the ends of a plurality of conventional wires of a round cable F (FIG. 1) anchored in a manner to provide a plurality of rows of terminals making contact with the cable terminals 16. To this end, the bared ends of the wires of cable F may be formed into rectangular hooks 51 and threaded into pairs of holes 52 in board 50, with the transverse portions 53 lying against the surface of board 50 which faces the chamber 21 and constituting the terminals which engage the terminals 16 of cable A.

FIG. 11 discloses a modified form of the invention wherein the elastomer cushion C is replaced by one or more ribbon springs C' of corrugated form disposed in receptacle A between receptacle bottom 22 and terminal complex 16–19 of cable B and having corrugations extending transversely in bridging relation to the spacer rods 19 and spring loading them for resilient pressure contact of terminals 16 against the terminals of a component that is coupled to the assembly A, B, C'. The ends of springs C' are received in the vertical slots 20, and thus the springs are located in registration with the respective spacer rods 19. The individual corrugations are preferably spaced to register individually with the terminal strips, engaging the insulated back sides thereof.

While in most embodiments of the invention disclosed herein the spacer rods 19 are shown in pairs, it is to be understood that in some applications of the invention a plurality of spacer rods of a number greater than two may be utilized. For example, an arrangement may be utilized wherein three or more spacer rods, in an arrangement wherein a series of every third or every fourth or fifth, etc., terminal strip 16 is brought over a respective rod, may be combined with three or more successively positioned printed circuit boards, each connected to a respective series of terminal strips. In some instances (as where alternate conductors of a ribbon cable are not to be utilized in a circuit, a single spacer rod, presenting a single series of alternate terminal strips, with intervening strips of the tape being "dead," could be usefully employed in some installations.

I claim:

1. In a multiple-conductor connector assembly, in combination: a receptacle defining a shallow rectangular chamber; a multiple conductor ribbon cable having a slitted portion providing a plurality of terminal strips comprising respective conductors having bared contact faces and insulating backings on the opposite faces of said conductors; a spacer rod basket-woven between said terminal strips and providing therewith a terminal complex received in said chamber with said spacer rod supporting alternate strips with their contact faces raised in electrical contact positions; resilient means interposed between the bottom of said receptacle chamber and said basket-woven assembly of terminal strips and spacer rod and yieldingly supporting said assembly with said faces in said contact positions; and an electrical component having a plurality of terminals arranged in a row in spaced relation such as to register with said raised contact faces, said component being coupled to said receptacle so as to mate said component terminals with said raised contact faces and to apply pressure thereto so as to place said basket-woven assembly and said resilient means under compression such as to cushion-load said raised contact faces into electrical conductive contact with said component terminals.

2. A connector assembly as defined in claim 1, wherein said coupled electrical component comprises a second ribbon cable with a basket-woven complex of spaced rod and slitted end terminal strips having bared conductor faces contacting said raised contact faces, and a receptacle covering said basket-woven complex and coupled to said first mentioned receptacle so as to apply compression through said complex to said resilient means and said basket-woven assembly of the first mentioned cable, such as to maintain electrical contact between said raised contact faces and circuit board terminals.

3. A connector assembly as defined in claim 1, wherein said coupled electrical component comprises a printed circuit board having printed terminals arranged in a row for mating contact with said raised contact faces; and a back-up plate secured to said receptacle over said chamber and defining with said receptacle a slot for reception of the edge portion of said circuit board in a position in which said printed terminals compressively engage said raised contact faces so as to place the assembly of said resilient means and said basket-woven complex of terminal strips under compression such as to maintain electrical contact between said raised contact faces and circuit board terminals.

4. A connector assembly as defined in claim 1, wherein said terminal strips are embodied in a slitted intermediate portion of said cable, wherein said cable has body portions extending from both ends of said intermediate slitted portion, and wherein said coupled electrical component comprises another multiple conductor ribbon cable having a slitted end portion providing a plurality of terminal strips comprising respective conductors having bared contact faces in contact with respective raised contact faces of said intermediate slitted cable portion to provide a T-junction, and including a second receptacle covering the assembly of said slitted end portion of the second cable and said slitted intermediate portion of the first cable and coupled to said first mentioned receptacle so as to place said assembly under compression such as to provide resilient loading of the interengagement of the respective contact faces.

5. A connector assembly as defined in claim 1, wherein said coupled electrical component comprises a second cable including a plurality of projecting wires having bared ends, and a terminal panel attached to said receptacle over said chamber and having a plurality of apertures through which said wires extend from the outer face thereof, said bared ends being bent so as to lie against the inner face of said terminal panel in positions disposed in a row for contact with respective terminal strips of said first mentioned cable, said terminal panel placing said complex of terminal strips and said resilient means under compression to maintain the electrical contact between said strips and said wire terminals.

6. Connector apparatus as defined in claim 1, wherein said resilient means consists of a cushion of compressible resilient material fitted within and lying against the bottom of said chamber beneath said basket-woven complex of terminal strips and applying resilient pressure to all of them.

7. Connector apparatus as defined in claim 1, wherein said resilient means comprises a corrugated ribbon spring interposed between said complex of basket-woven terminal strips and the bottom of said chamber and in registration with said spacer rod and applying yielding cushioning pressure to all of said terminal strips.

8. A connector assembly as defined in claim 1, wherein said receptacle has in its respective ends, slots perpendicular to the bottom of said chamber, in which the ends of said spacer rods are retained.

9. A connector assembly as defined in claim 1, wherein said spacer rod includes a tubular sheath of compressible resilient material constituting a cushioning surface thereof and providing individual cushioning support of the raised portions of said terminal strips.

10. In a multiple-conductor connector assembly, in combination: a receptacle defining a shallow rectangular chamber; a multiple conductor ribbon cable having a slitted end portion providing a plurality of terminal strips comprising respective conductors having bared contact faces and insulating backings on the opposite faces of said conductors; a pair of spacer rods basket-woven between said terminal strips and providing therewith a terminal complex received in said chamber with one of said spacer rods supporting alternate strips to provide one row of raised contact faces and with the other spacer rod supporting the intervening strips to provide a second row of raised contact faces spaced from said one row longitudinally of the cable; resilient means interposed between the bottom of said receptacle chamber and said terminal complex and yieldingly supporting said complex with said two rows of faces in raised contact positions; and an electrical component having a plurality of spaced terminals arranged in respective spaced rows positioned to register with said raised contact faces, said component being coupled to said receptacle so as to mate said component terminals with said raised contact faces and to apply pressure thereto so as to place said terminal complex and said resilient means under compression such as to cushion-load said raised contact faces into electrical conductive contact with said component terminals.

11. A multiple conductor connector assembly as defined in claim 10, wherein said coupled component comprises a modular assembly of miniature electrical functional devices and a mounting panel on which said devices are arranged in a row, and rows of contact terminals on said mounting board on respective sides of said row of functional devices and connected thereto, said mounting board being secured to said receptacle in covering relation to said chamber and pressing said board terminals into contact with respective rows of raised contact faces of said terminal complex and placing said complex and said resilient means under compression to maintain electrical contact between said terminals and contact faces.

12. A connector assembly as defined in claim 11, wherein said cover means comprises a back-up panel of L-section, wherein said rows of terminals are disposed in a common plane on a front side of said circuit board, wherein said backup panel engages the back of said circuit board to apply said pressure, and wherein said spacer rods include tubular sheaths each of compressible resilient material constituting a cushioning surface thereof and providing individual cushioning support of the raised portions of said terminal strips.

13. A connector assembly as defined in claim 11, wherein said rows of terminals are disposed on respective front and back faces of said circuit board and wherein said terminal complex is folded around the edge of said circuit board and said rows of raised contact faces are disposed at the front and back sides of the board respectively.

References Cited by the Examiner

UNITED STATES PATENTS

| | | | |
|---|---|---|---|
| 2,730,683 | 1/1956 | Ayres et al. | 339—17 |
| 3,037,181 | 5/1962 | Leshner | 339—17 |
| 3,189,864 | 6/1965 | Angele et al. | 339—176 |

FOREIGN PATENTS

| | | |
|---|---|---|
| 922,729 | 4/1963 | Great Britain. |

PATRICK A. CLIFFORD, *Primary Examiner.*

W. D. MILLER, *Assistant Examiner.*